(12) United States Patent
Yang et al.

(10) Patent No.: US 7,539,563 B2
(45) Date of Patent: May 26, 2009

(54) SYSTEM AND METHOD FOR IDENTIFYING OBJECTS IN A SPACE

(75) Inventors: Gyung-hye Yang, Seoul (KR); Hyoung-ki Lee, Suwon-si (KR)

(73) Assignee: Samsung Electronics Co., Ltd., Suwon-Si (KR)

(*) Notice: Subject to any disclaimer, the term of this patent is extended or adjusted under 35 U.S.C. 154(b) by 331 days.

(21) Appl. No.: 11/214,841

(22) Filed: Aug. 31, 2005

(65) Prior Publication Data

US 2006/0095170 A1    May 4, 2006

(30) Foreign Application Priority Data

Nov. 3, 2004 (KR) .................. 10-2004-0088909

(51) Int. Cl.
*G01C 22/00* (2006.01)
(52) U.S. Cl. .................... 701/24; 701/23; 701/207; 701/211; 180/167; 700/245; 700/259; 382/181
(58) Field of Classification Search ............ 701/23–25, 701/200, 207, 211; 382/103, 190, 181; 700/245–246, 700/249–250, 253, 79–80, 259; 250/559.33; 340/463; 171/107; 707/112; 719/318; 180/167
See application file for complete search history.

(56) References Cited

U.S. PATENT DOCUMENTS

| | | | | |
|---|---|---|---|---|
| 4,942,539 A | * | 7/1990 | McGee et al. | 700/253 |
| 4,954,962 A | * | 9/1990 | Evans et al. | 701/28 |
| 5,144,685 A | * | 9/1992 | Nasar et al. | 382/153 |
| 5,961,571 A | * | 10/1999 | Gorr et al. | 701/207 |
| 6,005,610 A | * | 12/1999 | Pingali | 348/169 |
| 6,711,293 B1 | * | 3/2004 | Lowe | 382/219 |
| 6,816,753 B2 | * | 11/2004 | Sakamoto et al. | 700/245 |
| 6,829,568 B2 | * | 12/2004 | Julier et al. | 702/189 |
| 6,917,855 B2 | * | 7/2005 | Gonzalez-Banos et al. | 700/245 |
| 6,934,603 B1 | * | 8/2005 | Kochanneck | 700/245 |
| 7,015,831 B2 | * | 3/2006 | Karlsson et al. | 340/995.1 |

(Continued)

FOREIGN PATENT DOCUMENTS

GB       2437773 A   * 11/2007

(Continued)

OTHER PUBLICATIONS

Telerobotic system for live power lines maintenance: ROBTET, Penin, L.F.; Aracil, R.; Ferre, M.; Pinto, E.; Hernando, M.; Barrientos, A.; Robotics and Automation, 1998. Proceedings. 1998 IEEE International Conference on , vol. 3, May 16-20, 1998 pp. 2110-2115 vol. 3, Digital Object Identifier 10.1109/ROBOT.1998.680632.*
Robot vision tracking system, Kabuka, M.; Desoto, J.; Miranda, J.; Industrial Electronics, IEEE Transactions on, vol. 35, Issue 1, Feb. 1988 pp. 40-51, Digital Object Identifier 10.1109/41.3061.*

(Continued)

*Primary Examiner*—Cuong H Nguyen
(74) *Attorney, Agent, or Firm*—Staas & Halsey LLP

(57) ABSTRACT

A system and method for identifying objects existing in a space. The system includes a mobile robot obtaining object identification information of each object in the space and transmitting the object identification information, and a remote control unit receiving the object identification information, identifying each object based on the object identification information, and allocating an identifier to each identified object.

10 Claims, 14 Drawing Sheets

U.S. PATENT DOCUMENTS

| | | | | |
|---|---|---|---|---|
| 7,135,992 | B2 * | 11/2006 | Karlsson et al. | 340/995.1 |
| 7,145,478 | B2 * | 12/2006 | Goncalves et al. | 340/995.1 |
| 7,162,338 | B2 * | 1/2007 | Goncalves et al. | 701/23 |
| 7,177,737 | B2 * | 2/2007 | Karlsson et al. | 701/23 |
| 7,272,467 | B2 * | 9/2007 | Goncalves et al. | 700/245 |
| 2004/0167688 | A1 * | 8/2004 | Karlsson et al. | 701/23 |
| 2006/0095170 | A1 * | 5/2006 | Yang et al. | 701/23 |

FOREIGN PATENT DOCUMENTS

| | | | |
|---|---|---|---|
| JP | 59114407 | A * | 7/1984 |
| JP | 2005088146 | A * | 4/2005 |
| JP | 3665730 | B2 * | 6/2005 |
| JP | 2005177858 | A * | 7/2005 |
| JP | 2007124932 | A * | 5/2007 |
| KR | 2002-39805 | | 5/2002 |
| KR | 2004-64106 | | 7/2004 |
| KR | 2008006925 | A * | 1/2008 |
| RU | 2216705 | C2 * | 11/2003 |

OTHER PUBLICATIONS

Autonomous 3-D positioning of surgical instruments in robotized laparoscopic surgery using visual servoing,Krupa, A.; Gangloff, J.; Doignon, C.; de Mathelin, M.F.; Morel, G.; Leroy, J.; Soler, L.; Marescaux, J., Robotics and Automation, IEEE Transactions of vol. 19, Issue 5, Oct. 2003 pp. 842-853, Digital Object Identifier 10.1109/TRA.200.*

Optical methods for calibrating and inspecting robots, Kyle, S.A.; Computing & Control Engineering Journal vol. 6, Issue 4, Aug. 1995 pp. 166-173.*

Robust Tracking of Multiple People in Crowds Using Laser Range Scanner, Jinshi Cui; Hongbin Zha; Huijing Zhao; Shibasaki, R.; Pattern Recognition, 2006. ICPR 2006. 18th International Conference on , vol. 4, 0-0 0 pp. 857-860, Digital Object Identifier 10.1109/ICPR.2006.1017.*

Stereo vision based human body detection from a localized mobile robot, Bahadori, S.; Iocchi, L.; Nardi, D.; Settembre, G.P.; Advanced Video and Signal Based Surveillance, 2005. AVSS 2005. IEEE Conference on, Sep. 15-16, 2005 pp. 499-504 Digital Object Identifier 10.1109/AVSS.2005.1577319.*

Fast object location and tracing using two CCD cameras and laser range finder,Yunting Pang; Qiang Huang; Xiaolei Quan; Juan Zheng; Xiaobing Wu; Information Acquisition, 2005 IEEE International Conference on, Jun. 27-Jul. 3, 2005 p. 5 pp. Digital Object Identifier 10.1109/ICIA.2005.1635114.*

The Mars Exploration Rover instrument positioning system, Baumgartner, E.T.; Bonitz, R.G.; Melko, J.P.; Shiraishi, L.R.; Chris Leger, P.; Aerospace, 2005 IEEE Conference, Mar. 5-12, 2005 pp. 1-19, Digital Object Identifier 0.1109/AERO.2005.1559295.*

Developing a service robot, Iwashita, S.; Murase, Y.; Yasukawa, Y.; Kanda, S.; Sawasaki, N.; Asada, T.; Mechatronics and Automation, 2005 IEEE International Conference, vol. 2, Jul. 29-Aug. 1, 2005 pp. 1057-1062 vol. 2.*

Experimental validation of a MATLAB based control architecture for multiple robot outdoor navigationDoitsidis, L.; Nelson, A.L.; Valavanis, K.P.; Long, M.T.; Murphy, R.R.; Intelligent Control, 2005. Proceedings of the 2005 IEEE International Symposium on, Mediterrean Conference on Control and Automation,2005 pp. 1499-1505, Digital Object Ide.*

3D ground adaptive synthetic aperture radar for landmine detection, Yabushita, H.; Kanehama, M., Hirata, Y.; Kosuge, K.; Intelligent Robots and Systems, 2005. (IROS 2005). 2005 IEEE/RSJ International Conference on, Aug. 2-6, 2005 pp. 2620-2625, Digital Object Identifier 10.1109/IROS.2005.1545248.*

Mobile robot start-up positioning using internal analysis, Martinez, A.B.; Escoda, J.; Benedico, A.; Intelligent Robots and Systems, 2005. (IROS 2005). 2005 IEEE/RSJ International Conference on, Aug. 2-6, 2005 pp. 3348-3353, Digital Object Identifier 10.1109/IROS.2005.1545089.*

Modeling environment of mobile robots, Halilagic, R.; Gaco, D.; Kulenovic, F.; Information Technology Interfaces, 2005. 27th International Conference on, Jun. 20-23, 2005 pp. 371-376, Digital Object Identifier 10.1109/ITI.2005.1491155.*

A real-time image recognition system for tiny autonomous mobile robots, Mahlknecht, S.; Oberhammer, R.; Novak, G.; Real-Time and Embedded Technology and Applications Symposium, 2004. Proceedings. RTAS 2004. 10th IEEE, May 25-28, 2004 pp. 324-330, Digital Object Identifier 10.1109/RTTAS.2004.1317278.*

Detecting and modeling doors with mobile robots, Anguelov, D.; Koller, D.; Parker, E.; Thrun, S.; Robotics and Automation, 2004. Proceedings. ICRA '04. 2004 IEEE International Conference on, vol. 4, Apr. 26, -May 1, 2004, pp. 3777-3784 vol. 4.*

2003 IEEE International Conference On Robotics And Automation, Robotics and Automation, 2003. Proceedings. ICRA '03. IEEE International Conference on , vol. 3, Sep. 14-19, 2003 pp. 0_1-Iii.*

Using learned visual landmarks for intelligent topological navigation of mobile robots, Mata, M.; Armingol, J.M.; de la Escalera, A.; Salichs, M.A.; Robotics and Automation, 2003. Proceedings. ICRA '03. IEEE International Conference on, Vol. 1, Sep. 14-19, 2003 pp. 1324-1329 vol. 1, Digital Object Identifier 10.1109/Robot.2003.1241775.*

Proceedings. 1998 IEEE/RSJ International Conference on Intelligent Robots and Systems. Innovations in Theory, Practice and Applications (Cat. No.98CH36190), Intelligent Robots and Systems, 1998. Proceedings., 1998 IEEE/RSJ International Conference on , vol. 1, Oct. 13-17, 1998, Digital Object Identifier 10.1109/IROS.1998. 724585.*

Proceedings 1998 IEEE/RSJ Inteernational Conference on Intelligent Robots and Systems, Intelligent Robots and Systems, 1998. Proceedings., 1998 IEEE/RSJ International Conference on , vol. 2, Oct. 13-17, 1998 pp. i-xxxv.*

Space robot autonomy based on distance sensors, Bizzantino, P.; De Bartolomei, M.; Magnani, G.; Visentin, G.; Robotics and Automation, 1998. Proceedings. 1998 IEEE International Conference on , vol. 1, May 16-20, 1998 pp. 200-205 vol. 1 Digital Object Identifier 10.1109/ROBOT.1998.676373.*

Ensuring visibility in calibration-free path planning for image-based visual servoing; Schramm, F.; Morel, G.; Robotics, IEEE Transactions on; vol. 22, Issue 4, Aug. 2006 pp. 848-854; Digital Object Identifier 10.1109/TRO.2006.878955.*

Dynamic Denoising of Tracking Sequences; Michailovich, O.; Tannenbaum, A.; Image Processing, IEEE Transactions on vol. 17, Issue 6, Jun. 2008 pp. 847-856; Digital Object Identifier 10.1109/TIP.2008. 920795.*

Dynamic sensor-based control of robots with visual feedback; Weiss, L.; Sanderson, A.; Neuman, C.; Robotics and Automation, IEEE Journal of; vol. 3, Issue 5, Oct. 1987 pp. 404-417; Digital Object Identifier 10.1109/JRA.1987.1087115.*

Fuzzy control of a mobile robot; Cupertion, F.; Giordano, V.; Naso, D.; Delfine, L.; Robotics & Automation Magazine, IEEE vol. 13, Issue 4, Dec. 2006 pp. 74-81; Digital Object Identifier 10.1109/MRA.2006.250563.*

Model Predictive Control for Transparent Teleoperation Under Communication Time Delay: Sirouspour, S.; Shahdi, A.; Robotics, IEEE Transactions on; vol. 22, Issue 6, Dec. 2006 pp. 1131-1145; Digital Object Identifier 10.1109/TRO.2006.882939.*

Three-Dimensional Model-Based Object Recognition and Segmentation in Cluttered Scenes; Mian, A.S.; Bennamoun, M.; Owens, R.; Pattern Analysis and Machine Intelligence, IEEE Transactions on; vol. 28, Issue 10, Oct. 2006 pp. 1584-1601; Digital Object Identifier 10.1109/TPAMI.2006.213.*

A Multithreaded Distributed Telerobotic Framework; Al-Mouhamed, M.A.; Toker, O.; Iqbal, A.; Mechatronics, IEEE/ASME Transactions on; vol. 11, Issue 5, Oct. 2006 pp. 558-566; Digital Object Identifier 10.1109/TMECH.2006.882986.*

The Sensor Selection Problem for Bounded Uncertainty Sensing Models; Isler, V.; Bajcsy, R.; Automation Science and Engineering, IEEE Transactions on; vol. 3, Issue 4, Oct. 2006 pp. 372-381; Digital Object Identifier 10.1109/TASE.2006.876615.*

Notice of Examination Report issued by the Korean Intellectual Property Office in Application No. 10-2004-0088909 dated Feb. 15, 2006.

* cited by examiner

FIG. 5

| NAME | WIDTH (cm) | HEIGHT (cm) | LENGTH (cm) | OTHERS | CHARACTERISTICS |
|---|---|---|---|---|---|
| BED | 105 | 90 | 210 | SINGLE | DEFAULT VALUE OF WIDTH CHANGES ACCORDING TO SIZE, BUT DEFAULT VALUES OF HEIGHT AND LENGTH DO NOT CHANGE |
|  | 145 | 90 | 210 | DOUBLE |  |
|  | 160 | 95 | 210 | QUEEN |  |
| DESK | 160 ~ 180 | 75 | 70 ~ 80 |  | DEFAULT SHAPE IS SQUARE BUT MAY BE "¬". IT ALWAYS GOES WITH CHAIR. |
| WARDROBE | 340 ~ 350 | 60 ~ 65 | 210 | 10 FEET | WIDTH CHANGES ACCORDING TO HORIZONTAL LENGTH OF WALL |
|  | 340 ~ 350 | 60 ~ 65 | 210 | 12 FEET |  |
| SINK | FIXED | FIXED | FIXED | FIXED VALUE ACCORDING TO BUILT-IN AREA | DEFAULT VALUES OF WIDTH AND HEIGHT ARE FIXED. LENGTH CHANGES ACCORDING TO HORIZONTAL LENGTH OF WALL |
| REFRIGERATOR | 89 ~ 93 | 175 ~ 180 | 82 ~ 90 | SIDE-BY-SIDE DOOR IN DEFAULT | IT IS USUALLY LOCATED BESIDE SINK |
| SOFA | NOT FIXED | 80 ~ 90 | 900 ~ 950 | 3 PERSONS IN DEFAULT | DEFAULT VALUES OF WIDTH AND HEIGHT ARE FIXED. LENGTH CHANGES ACCORDING TO HORIZONTAL LENGTH OF WALL |

FIG. 6

| SPACE | NAME | PRIORITY ORDER | OTHERS |
|---|---|---|---|
| BEDROOM | BED | 1 | THE NUMBER OF ROOMS INFLUENCES THE NUMBER OF OBJECTS LOCATED IN BEDROOM. THE NUMBERS ARE USUALLY IN INVERSE PROPORTION TO EACH OTHER. |
| | WARDROBE | 1 | |
| | DRESSING TABLE | 2 | |
| | DRAWERS | 2 | |
| | DESK | 3 | |
| | CHAIR | 3 | |
| KITCHEN | SINK | 1 | SINK EXTENDS ALONG TWO CONNECTED WALLS. TABLE IS USUALLY LOCATED AT BORDER BETWEEN KITCHEN AND LIVING ROOM. |
| | REFRIGERATOR | 1 | |
| | TABLE | 2 | |
| | CHAIR | 2 | |

SYSTEM AND METHOD FOR IDENTIFYING OBJECTS IN A SPACE

CROSS-REFERENCE TO RELATED APPLICATIONS

This application claims priority from Korean Patent Application No. 10-2004-0088909 filed on Nov. 3, 2004 in the Korean Intellectual Property Office, the disclosure of which is incorporated herein by reference in its entirety.

BACKGROUND OF THE INVENTION

1. Field of the Invention

The present invention relates to a system and method for identifying objects appearing on a map created by a mobile robot, and more particularly, to a system and method for improving readability of a map representing objects existing in a space by using various types of object identification information.

2. Description of the Related Art

As recognition ability and determination ability have been added to robots that were introduced in industrial sites to perform simple assembling or processes, robots have been able to perform more advanced functions.

Moreover, unlike a stationary robot fixed to a certain place or installed in a preconfigured work environment, a mobile robot that can move by itself can be used in an extended work area such as an arbitrary work place or an outdoor space. Accordingly, the mobile robot is superior to the stationary robot since the mobile robot can play a greater variety of parts and perform a greater variety of tasks.

Robots are being used today to do tasks in places such as the deep sea and in nuclear power plants, which are dangerous and difficult to approach for humans. Mobile robots need to have the ability to autonomously set a work path, detect obstacles, and avoid collision to move and perform tasks in places in which satisfactory information cannot be obtained in advance.

Recently, simultaneous localization and mapping (SLAM) used by a robot to automatically build up a map within an unknown environment while at the same time keeping track of its current position has been researched and developed.

When a user controls a mobile robot using a map created using robot localization, information on various objects existing in the space is provided and regions to which the mobile robot can enter and other regions are visually shown.

Accordingly, the user can more accurately command and control the mobile robot than when controlling the mobile robot with only an image that the mobile robot receives.

However, when a map created through measurement by a mobile robot is used as it is, readability is not good enough for a user to easily and quickly control the mobile robot.

Therefore, a user interface enabling a user to easily identify objects on a map and indicating what the objects are is desired.

SUMMARY OF THE INVENTION

The present invention provides a system and method for identifying an object existing in a space using various types of information and indicating what the object is using information regarding functional and spatial characteristics of the object.

The above stated aspect as well as other aspects, features and advantages, of the present invention will become clear to those skilled in the art upon review of the following description.

According to an aspect of the present invention, there is provided a system for identifying objects existing in a space, including a mobile robot obtaining object identification information of each object in the space and transmitting the object identification information; and a remote control unit receiving the object identification information, identifying each object based on the object identification information, and allocating an identifier to each identified object.

According to another aspect of the present invention, there is provided a mobile robot including a traveling unit moving the mobile robot, an identification information measurer measuring object identification information of each of objects existing in space, a controller controlling the traveling unit according to the object identification information and outputting the object identification information, and a wireless transceiver transmitting the object identification information output from the controller.

According to yet another aspect of the present invention, there is provided a remote control unit including a wireless transceiver receiving from a mobile robot object identification information of each of the objects existing in a space, a map processor identifying each object based on the object identification information and allocating an identifier to each identified object, and a user interface creating an object map using each identified object and its identifier and displaying the object map to a user.

According to still another aspect of the present invention, there is provided a method of identifying objects existing in a space, the method including obtaining object identification information of each object in the space using the mobile robot, transmitting the object identification information to a remote control unit using the mobile robot, receiving the object identification information using the remote control unit, identifying each object based on the object identification information using the remote control unit, and allocating an identifier to each identified object using the remote control unit.

BRIEF DESCRIPTION OF THE DRAWINGS

The above and other features and advantages of the present invention will become more apparent by describing in detail embodiments thereof with reference to the attached drawings in which:

FIG. 5 is a table showing information regarding functional characteristics of objects according to an embodiment of the present invention;

FIG. 6 is a table showing information regarding spatial characteristics of objects according to an embodiment of the present invention;

DETAILED DESCRIPTION OF THE PREFERRED EMBODIMENTS

Figure 1:
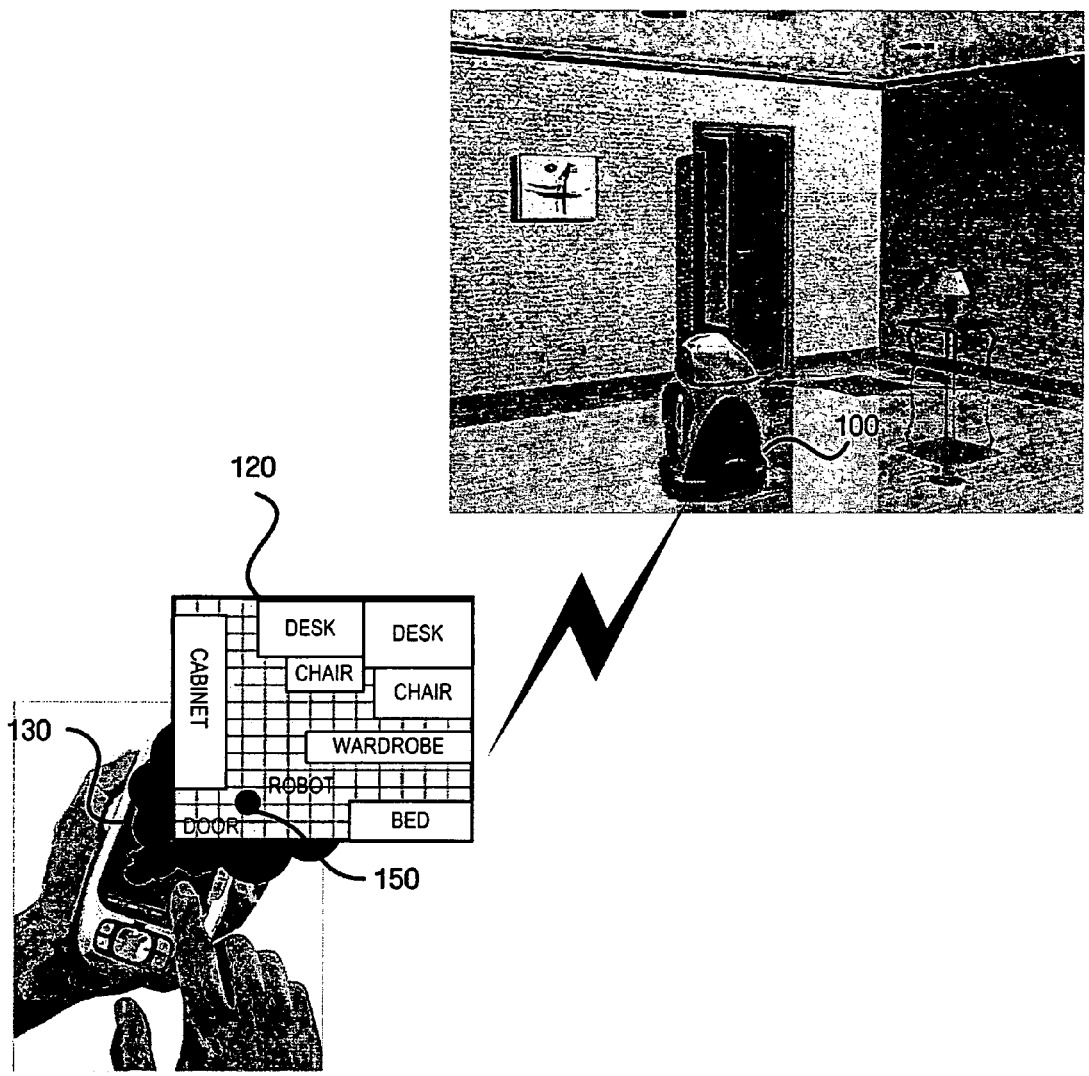
FIG. 1 is a schematic diagram of a system for identifying objects existing in space according to the present invention.

Advantages and features of the present invention and methods of accomplishing the same may be understood more readily by reference to the following detailed description of preferred embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. Like reference numerals refer to like elements throughout the specification.

A system and method for improving readability of a map representing objects existing in a space according to the present invention will now be described more fully with reference to the accompanying drawings, in which embodiments of the invention are shown. The present invention is described hereinafter with reference to flowchart illustrations of methods according to embodiments of the invention. It will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which are executed via the processor of the computer or other programmable data processing apparatus, create means for implementing the functions specified in the flowchart block or blocks.

These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks. And each block of the flowchart illustrations may represent a module, segment, or portion of code, which includes one or more executable instructions for implementing the specified logical function(s). It should also be noted that in some alternative implementations, the functions noted in the blocks may occur out of order. For example, two blocks shown in succession may in fact be executed substantially concurrently or the blocks may sometimes be executed in reverse order, depending upon the functionality involved.

FIG. 1 is a schematic diagram of a system for identifying objects existing in a space according to the present invention. The system includes a mobile robot 100 and a remote control unit 130 remotely controlling the mobile robot 100.

The mobile robot 100 measures width information, height information, and corner information of each object (hereinafter, referred to as "object identification information") while moving around the space and transmits the object identification information to the remote control unit 130. The remote control unit 130 includes a portable terminal device such as a personal digital assistant (PDA) that is easy to carry with and can communication with the mobile robot 100 using a wireless signal.

When the remote control unit 130 receives the object identification information from the mobile robot 100, an application within the remote control unit 130 creates a map 120 representing positions of objects existing in a space where the mobile robot 100 is located using the object identification information. Here, the application allocates an identifier to each object on the map 120 to enable a user to easily identify the object and provides the map 120 to the user through a user interface.

A current position of the mobile robot 100 is represented with a black circle 150 on the map 120. The user can designate a position to which the user wants to move the mobile robot 100 and command to move the mobile robot 100 to the designated position using an input device provided in the remote control unit 130. Here, the input device may be a motion key, a button, a ball mouse, or a touch screen that can input a leftward, rightward, upward, or downward movement. The touch screen can be used when an interface providing the map 120 is provided through a screen.

When the user controls the mobile robot 100 using the remote control unit 130, the mobile robot 100 cannot be moved to places where the objects represented on the map 120 are located.

Meanwhile, the remote control unit 130 creates the map 120 using the object identification information received from the mobile robot 100 through several stages. FIGS. 2A through 2E illustrate maps created in the stages.

Figure 2A:
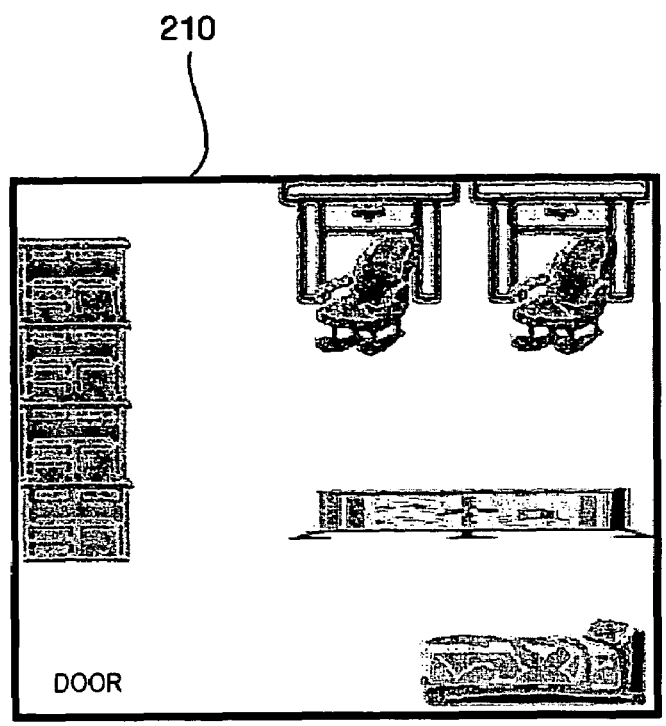
FIGS. 2A through 2E illustrate maps in stages of the method of creating an object map according to an embodiment of the present invention.

A map 210 shown in FIG. 2A represents a space in which the mobile robot 100 is currently located. When the mobile robot 100 transmits a result of measuring width information while moving around the space to the remote control unit 130, the remote control unit 130 creates a map 220 shown in FIG. 2B using the width information. On the map 220, a dark area is an area that the mobile robot 100 cannot approach and it may be considered that objects exist in the dark area. Thereafter, when the mobile robot 100 transmits a result of measuring corner information while moving around the space to the remote control unit 130, the remote control unit 130 creates a map 230 shown in FIG. 2C using the corner information. On the map 230, white circles correspond to corners of the objects. Thereafter, when the mobile robot 100 transmits a result of measuring height information while moving around the space to the remote control unit 130, the remote control unit 130 creates a map 240 shown in FIG. 2D using the height information. On the map 240, a block formed by connecting the same heights is represented as a single object and objects having the same height may be represented with the same color.

Figure 2B:
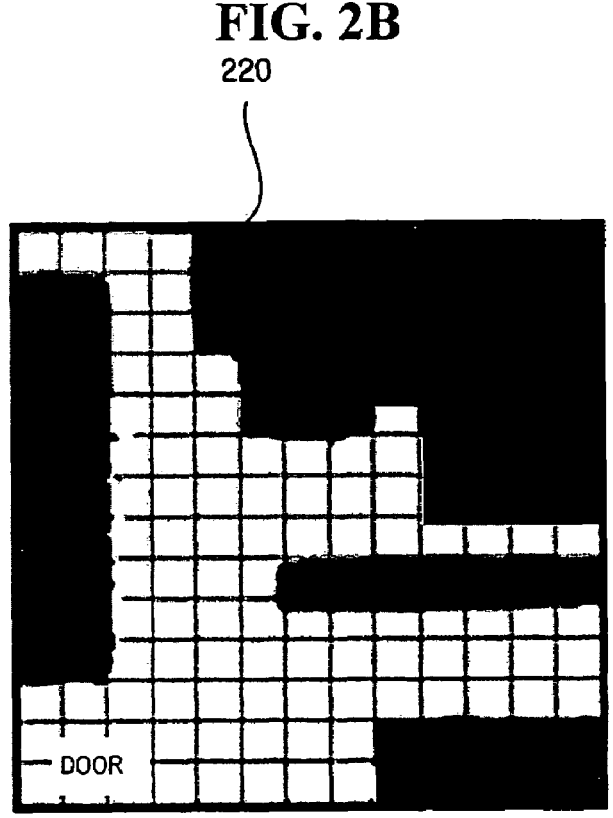
Figure 2C:
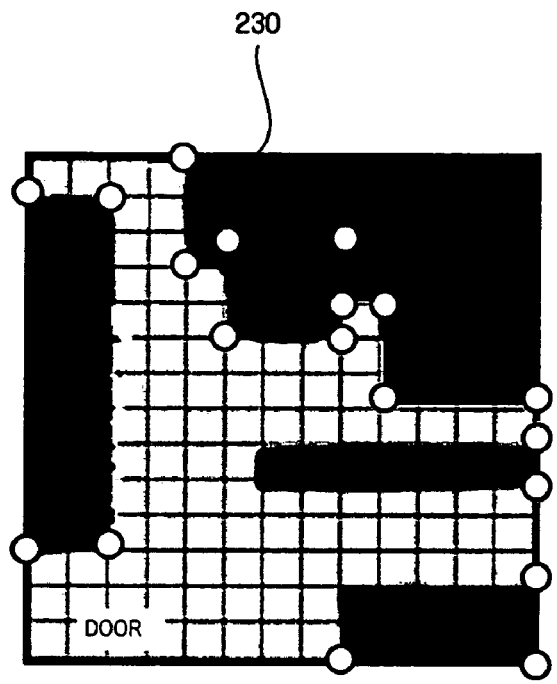
Figure 2D:
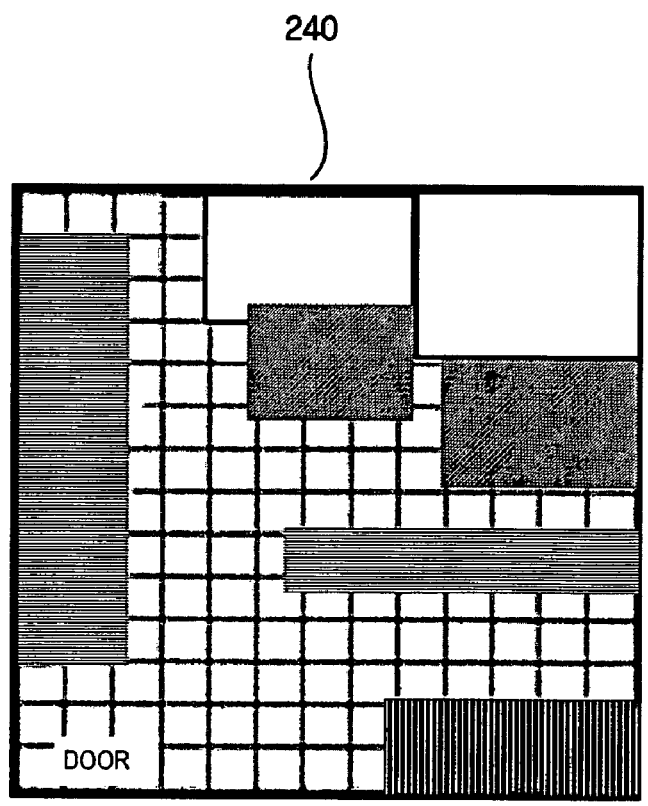
Figure 2E:
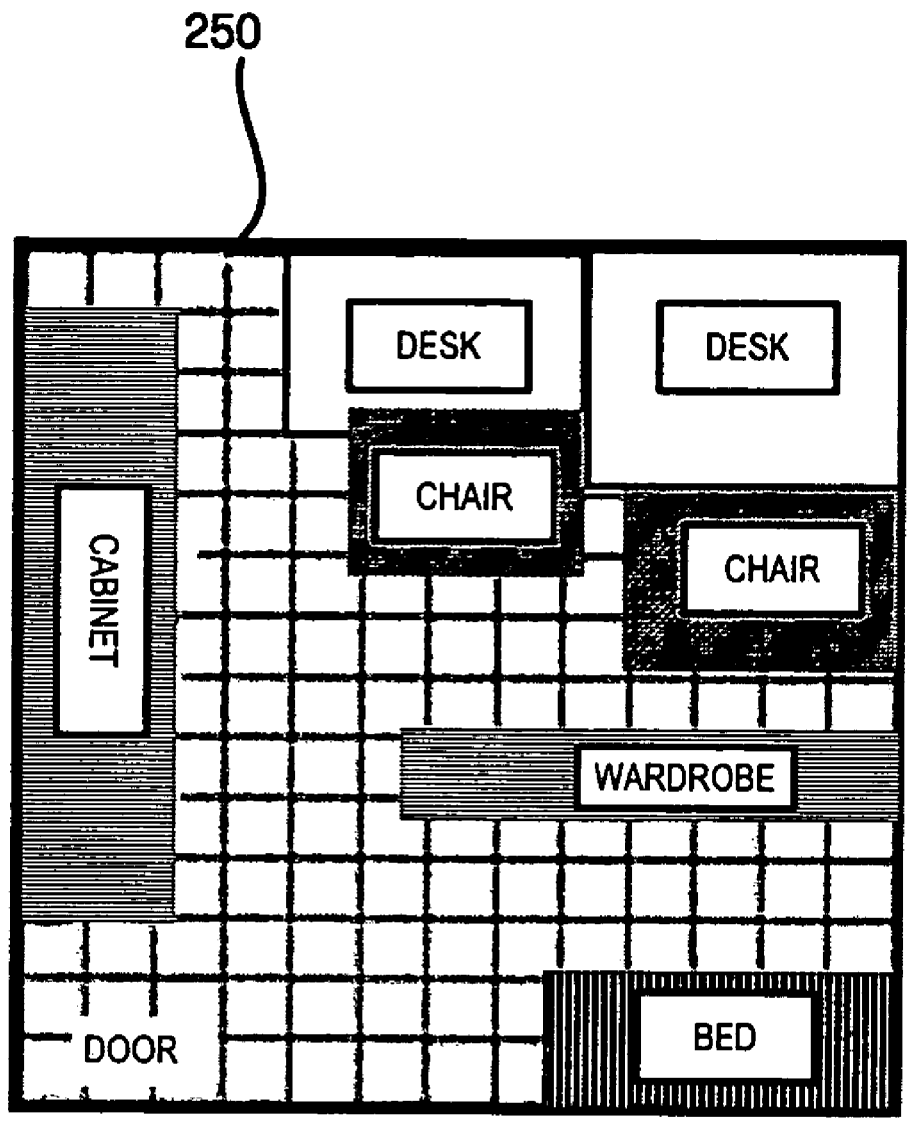

After the map 240 is created, the remote control unit 130 allocates an identifier to each object based on functional and spatial characteristics of the object to identify the object, thereby creating a map 250 shown in FIG. 2E. The identifier is expressed in text characters on the map 250 shown in FIG. 2E but may be expressed as an image icon.

Figure 3:
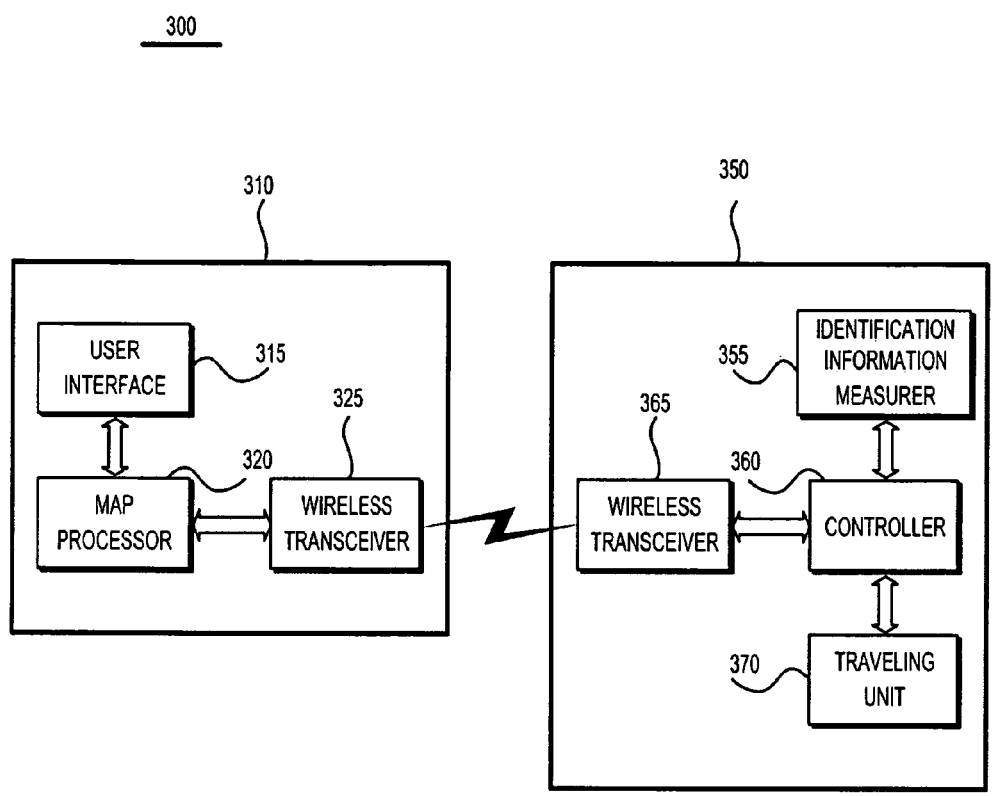
FIG. 3 is a block diagram of a system for identifying objects existing in space according to an embodiment of the present invention.

FIG. 3 is a block diagram of a system 300 for identifying objects existing in a space according to an embodiment of the present invention. The system 300 includes a mobile robot 350 and a remote control unit 310, which correspond to the mobile robot 100 and the remote control unit 130, respectively.

The mobile robot 350 includes a traveling unit 370 performing movement, an identification information measurer 355 measuring object identification information of an object existing in the space, a controller 360 controlling the traveling unit 370 according to the object identification information and outputting the object identification information, and a wireless transceiver 365 transmitting the object identification information received from the controller 360 to the remote control unit 310.

The remote control unit 310 includes a wireless transceiver 325 receiving from the mobile robot 350 object identification information of each of objects existing in the space, a map processor 320 identifying each object based on the object identification information and allocating an identifier to the object, and a user interface 315 creating an object map based on the identified object and its identifier and displaying the object map to the user.

The term 'unit' or 'module,' as used herein, means, but is not limited to, a software or hardware component, such as a Field Programmable Gate Array (FPGA) or Application Specific Integrated Circuit (ASIC), which performs certain tasks. A module may advantageously be configured to reside on the addressable storage medium and configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules.

Figure 4:
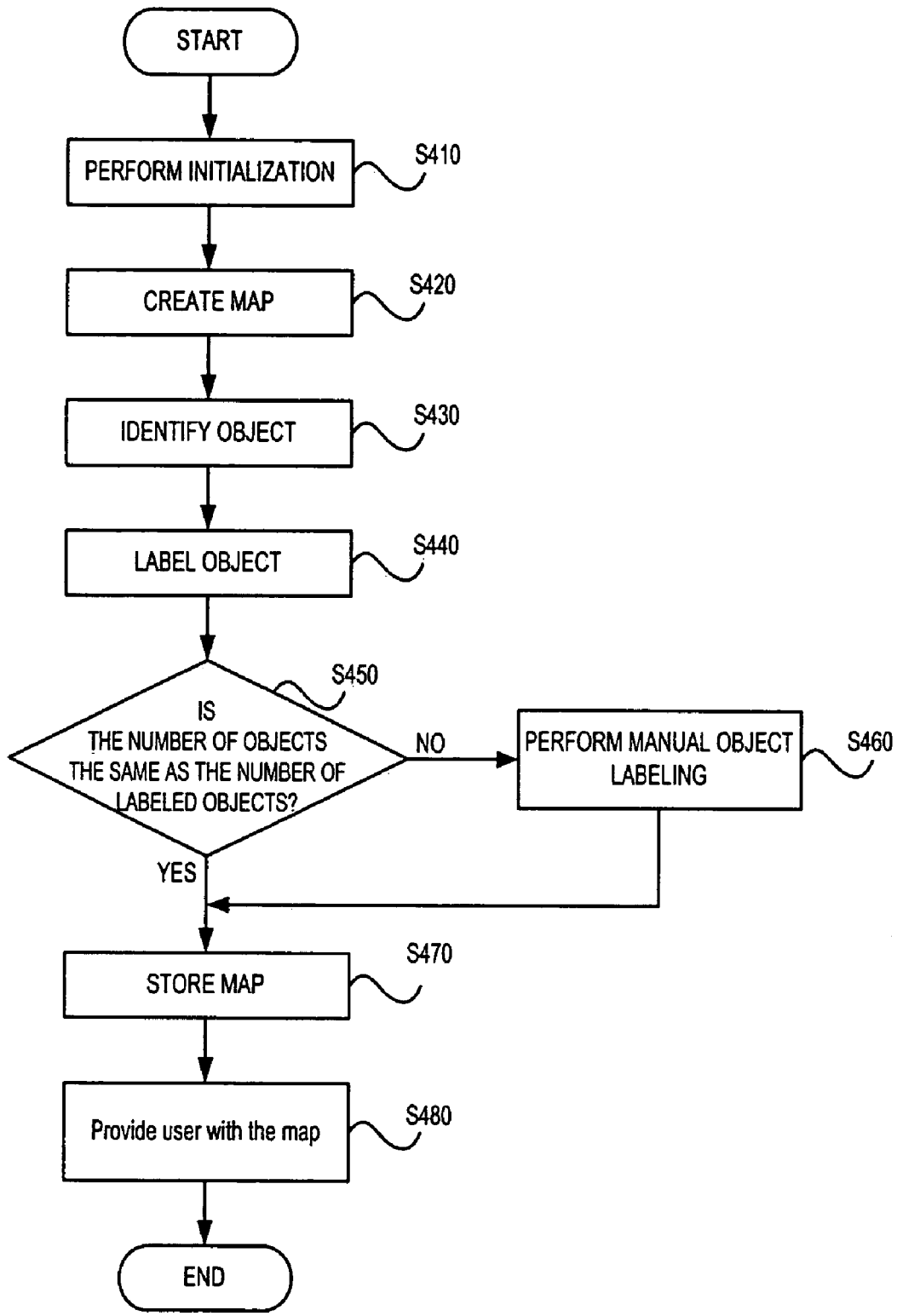
FIG. 4 is a flowchart of a method of identifying objects existing in space according to an embodiment of the present invention.

The operation of the system 300 will be described in detail with reference to FIG. 4.

In operation S410, when the mobile robot 350 commences an operation for map creation, the controller 360 performs initialization.

During the initialization, system resources needed by the mobile robot 350 to create a map are secured and a system environment of the mobile robot 350 is set to a state for measuring object identification information.

In operation S420, the controller 360 controls the identification information measurer 355 and the traveling unit 370 to measure object identification information such as width information, corner information, and height information of each object. The controller 360 can change a moving direction of the mobile robot 350 using the object identification information obtained by the identification information measurer 355.

In operation S430, the controller 360 may create maps like the maps 220, 230, and 240 respectively shown in FIGS. 2B, 2C, and 2D based on the object identification information and identifier of each object. Alternatively, the controller 360 may transmit the object identification information to the remote control unit 310 through the wireless transceiver 365. Then, the wireless transceiver 325 of the remote control unit 310 receives the object identification information and transmits it to the map processor 320. The map processor creates the maps 220, 230, and 240.

In identifying an object, for example, it is determined whether a figure appearing on a map has a quadrangular shape based on the width information and the corner information of the figure. If it is determined that the figure has the quadrangular shape, the figure is identified as a single object. If the figure does not have the quadrangular shape, an object can be identified based on the height information. In other words, when multiple pieces of height information are present, the same heights are connected to each other and each object can be identified. When only the same height information is present, it is determined that only a single object is present.

The map processor 320 has functional characteristic information and spatial characteristic information of each object. In operation S440, the map processor 320 performs an object labeling operation in which an identifier is allocated to each object. Here, the identifier may be expressed in text or an image icon and the object itself may be expressed in a three-dimensional shape. The format in which the identifier is expressed may be set in the remote control unit 310 in advance or may be selected by a user.

The functional characteristic information and the spatial characteristic information may be stored in the form of tables as shown in FIGS. 5 and 6, respectively. FIG. 5 shows functional characteristic information of the objects. FIG. 6 shows the spatial characteristic information of the objects. The functional characteristic information and the spatial characteristic information have an average quantitative characteristic of each object as a default value. In addition, in the spatial characteristic information, a priority order indicates the importance of an object in the space.

In operation S450, the map processor 320 included in the remote control unit 310 determines whether the number of objects appearing on the map is the same as the number of the objects to which an identifier have been allocated. When it is determined that the numbers are not the same, there is an object to which an identifier has not been allocated. In this case, the user is allowed to directly give an identifier to the object through manual object labeling in operation S460. For the manual object labeling, the remote control unit 310 may include a character input key or a touch pen as an input device used by the user to designate the identifier.

When identifiers are respectively allocated to all objects on the map, the map may have the same format as the map 250 shown in FIG. 2E. In operation S470, the map is stored in a storage area (not shown) included in the remote control unit 310. In addition, the map may be provided to the user through the user interface 315 in operation S480.

Figure 7:
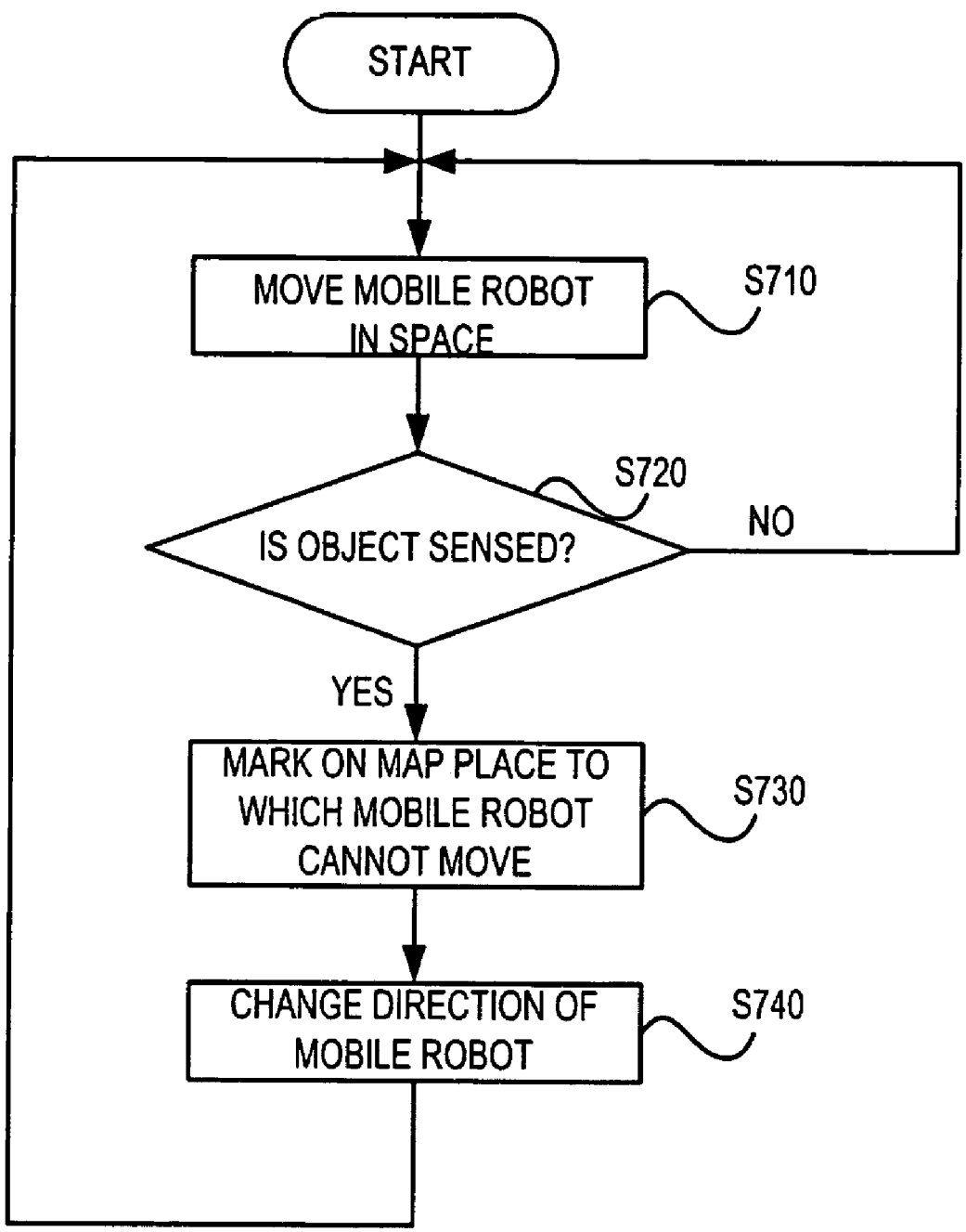
FIG. 7 is a flowchart of a method of obtaining width information according to an embodiment of the present invention.

FIG. 7 is a flowchart of a method of obtaining width information of an object according to an embodiment of the present invention.

In operation S710, the mobile robot 350 moves in space using the traveling unit 370. In operation S720, the identification information measurer 355 included in the mobile robot 350 senses an object using a sensor attached thereto. Here, the mobile robot 350 continuously moves in space and estimates and records its position until the sensor senses any object.

When an object is sensed by the sensor, the mobile robot 350 cannot move further toward a place in which the object is sensed.

Then, in operation S730, the identification information measurer 355 estimates a position of the place and marks the place on a map representing a space where the mobile robot 350 is present. In operation S740, the controller 360 controls the traveling unit 370 to change the moving direction of the mobile robot 350. Thereafter, the mobile robot 350 restarts moving in the space using the traveling unit 370.

After sensing all objects in the space and marking the estimated places on the map according to the method shown in FIG. 7, a map like the map 220 shown in FIG. 2B is obtained. Here, a position in the space may be expressed in unit of grids having a regular size as show in the map 220. In addition, black grids indicate an area to which the mobile robot 350 cannot move since an object is sensed by the sensor. Based on information contained in such map, a width of each object can be estimated. Meanwhile, conventional Simultaneous Localization and Map Building (SLAM) may be used to estimate and record a position of the mobile robot 350.

Figure 8:
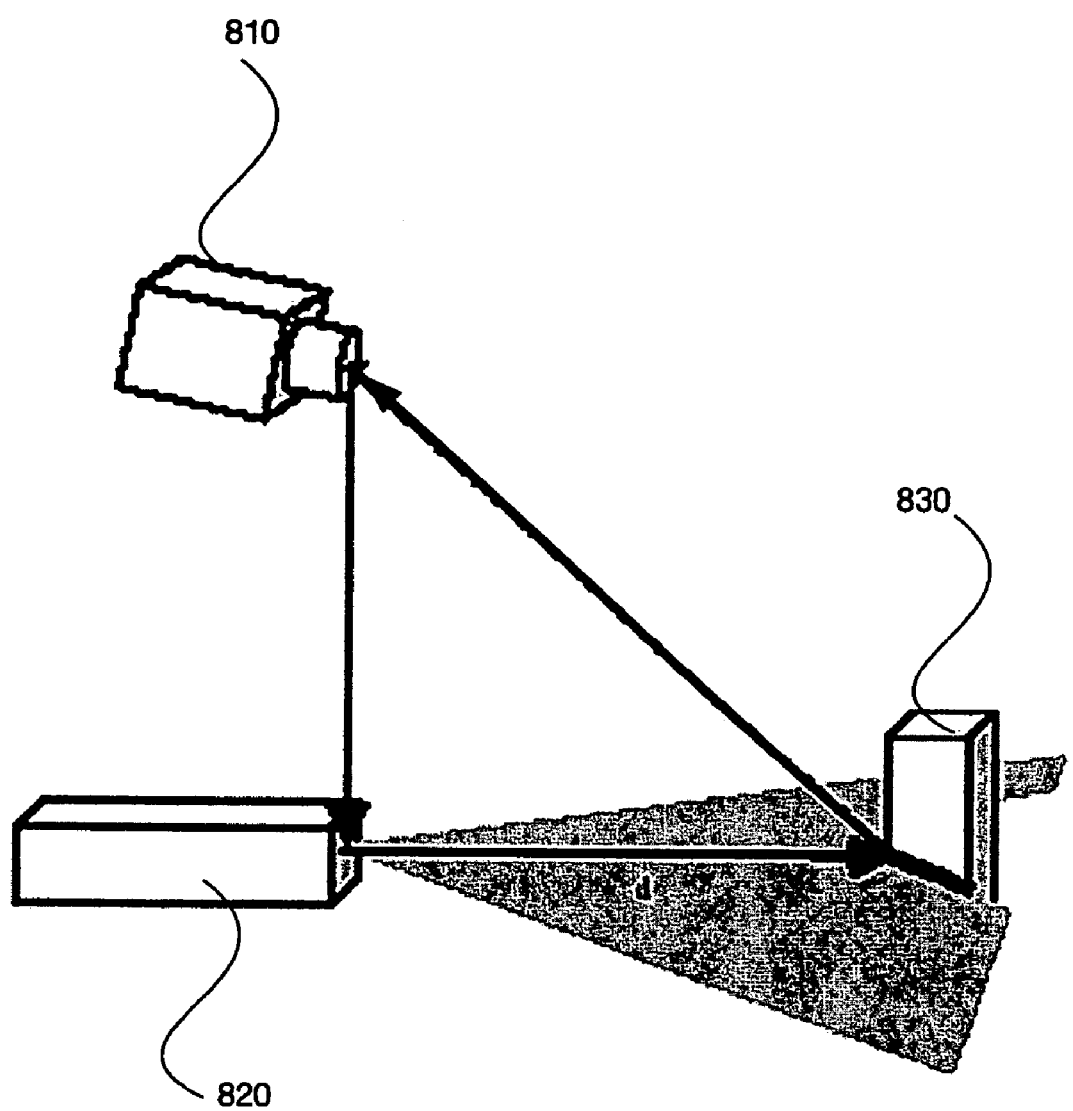
FIG. 8 illustrates a system for obtaining corner information according to an embodiment of the present invention.

FIG. 8 illustrates a system 800 for obtaining corner information according to an embodiment of the present invention. The system 800 may be installed in the identification information measurer 355 to recognize an object or to avoid collision. A light generator 820 emits light such as a laser beam to an obstacle (or a reflector) 830 in a predetermined form (e.g. in a plane form). An image reflected from the obstacle 830 is acquired by a camera 810.

Figure 9:
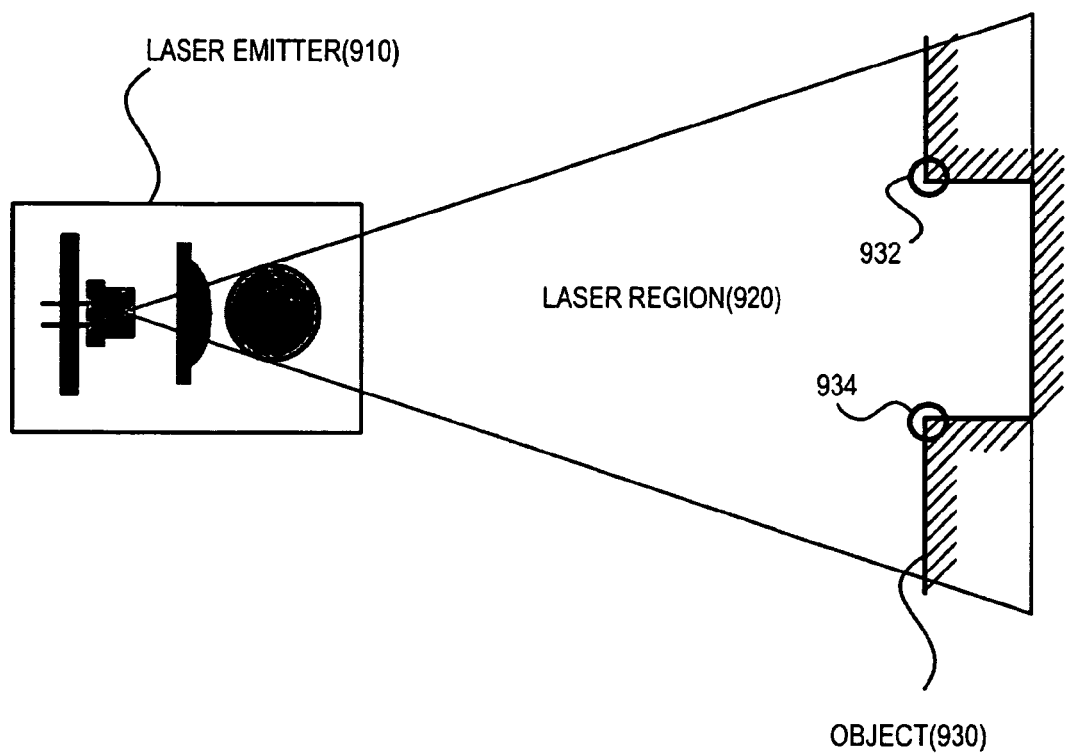
FIG. 9 illustrates a laser emitter and a laser region used to obtain the corner information according to an embodiment of the present invention.

FIG. 9 illustrates a laser emitter 910 and a laser region 920 used to obtain the corner information according to an embodiment of the present invention. The laser emitter 910 corresponds to the light generator 820 shown in FIG. 8 and the object 930 corresponds to the obstacle (or the reflector) 830. When laser light is emitted to the object 930 in a plane form, the laser region 920 is formed. When an image is formed by the laser light reflected from the object 930, a line of the image is viewed like it is interrupted due to irregularity of the object 930. In this case, it is estimated that corners 932 and 934 are present in the object 930.

Figure 10:
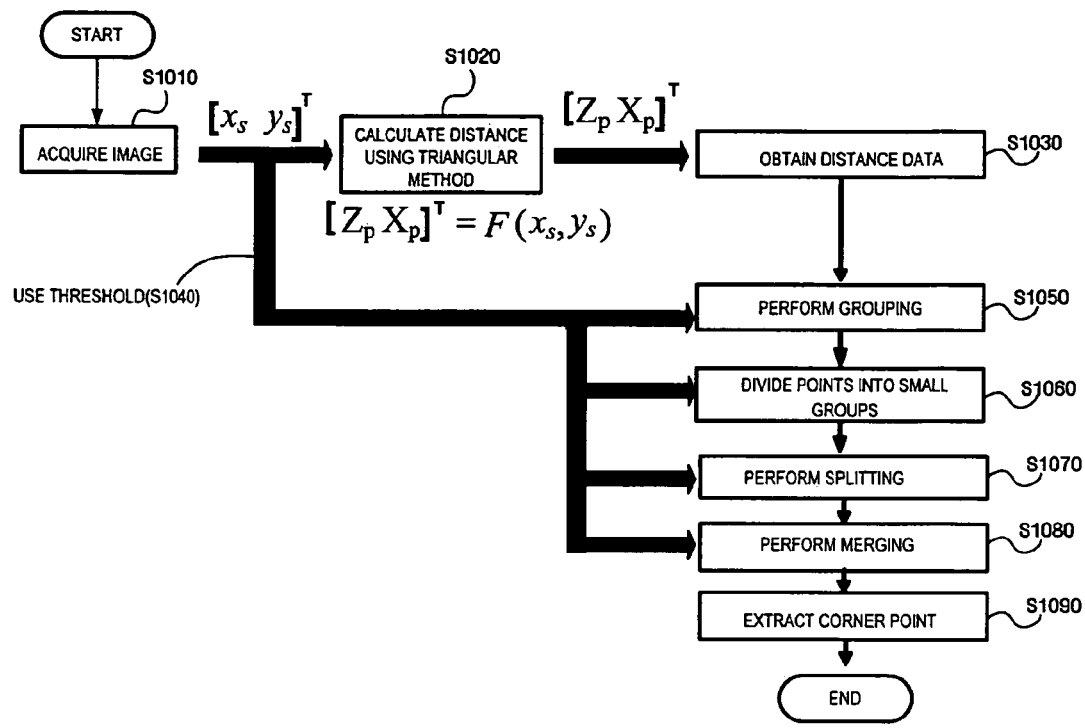
FIG. 10 is a flowchart of a method of obtaining the corner information according to an embodiment of the present invention.

FIG. 10 is a flowchart of a method of obtaining the corner information according to an embodiment of the present invention. In operation S1010, the light generator 820 emits light on the obstacle (or the reflector) 830 and the camera 810 acquires an image of the obstacle 830.

Figure 11:
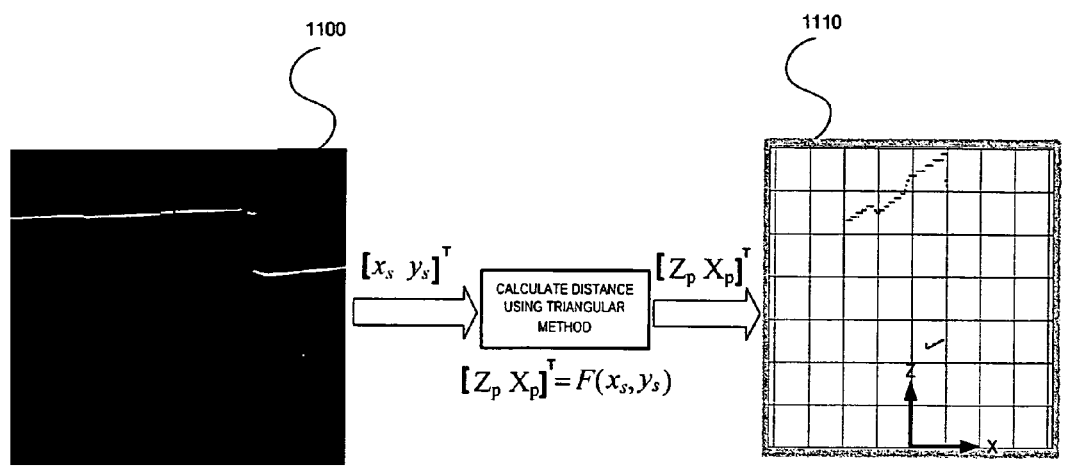
FIG. 11 illustrates a procedure for calculating distance data according to an embodiment of the present invention.

In operations S1020 and S1030, information on each of points in the acquired image is converted into a coordinate value on a plane according to distance calculation using a triangular method, thereby obtaining distance data. Here, the plane indicates a plane obtained when the light generator 820 and the obstacle 830 are viewed from above, as illustrated in FIG. 9. FIG. 11 illustrates the distance calculation using the triangular method. When a random coordinate value on an image 1100 acquired by the camera 810 is represented by $[x_s \; y_s]^T$ and a transformation according to the triangular method is represented by F, a plane coordinate value 1110 may be expressed as $[Z_p \; X_p]^T = F(x_s, y_s)$. Here, a Z-direction is a distance direction from a light emission point to the obstacle, i.e., reflector 830 reflecting the light. $F(x_s, y_s)$ is defined as the following equation:

$$F(x_s, y_s) = \begin{bmatrix} Z_p \\ X_p \end{bmatrix} = \begin{bmatrix} PY \cdot \dfrac{-\sin\alpha \cdot (ys - yo) \cdot a + \cos\alpha}{\sin\alpha + \cos\alpha \cdot (ys - yo) \cdot a} \\ \dfrac{PY \cdot (xs - xo) \cdot b}{\sin\alpha + \cos\alpha \cdot (ys - yo) \cdot a} \end{bmatrix},$$

where xo and yo indicate a position of the center of an image (in pixel units), PY is a distance between a camera and a projector emitting laser light, α is an angle at which the camera is tilted, and "a" and "b" are constants related to a scale indicating a ratio between an image pixel unit and a spatial distance. The function F is a two-dimensional vector and uses addition, subtraction, and absolute value calculation, which are applied to a normal two-dimensional vector.

In operation S1050 and S1060, adjacent points in the image are grouped based on the distance data so that all points in the image are divided into a plurality of groups. Thereafter, conventional split-merge is performed in operation S1070 and S1080. As a result, corner information can be extracted in operation S1090. A threshold is determined in operation S1040 and used in operations S1050 through S1080.

Figure 12:
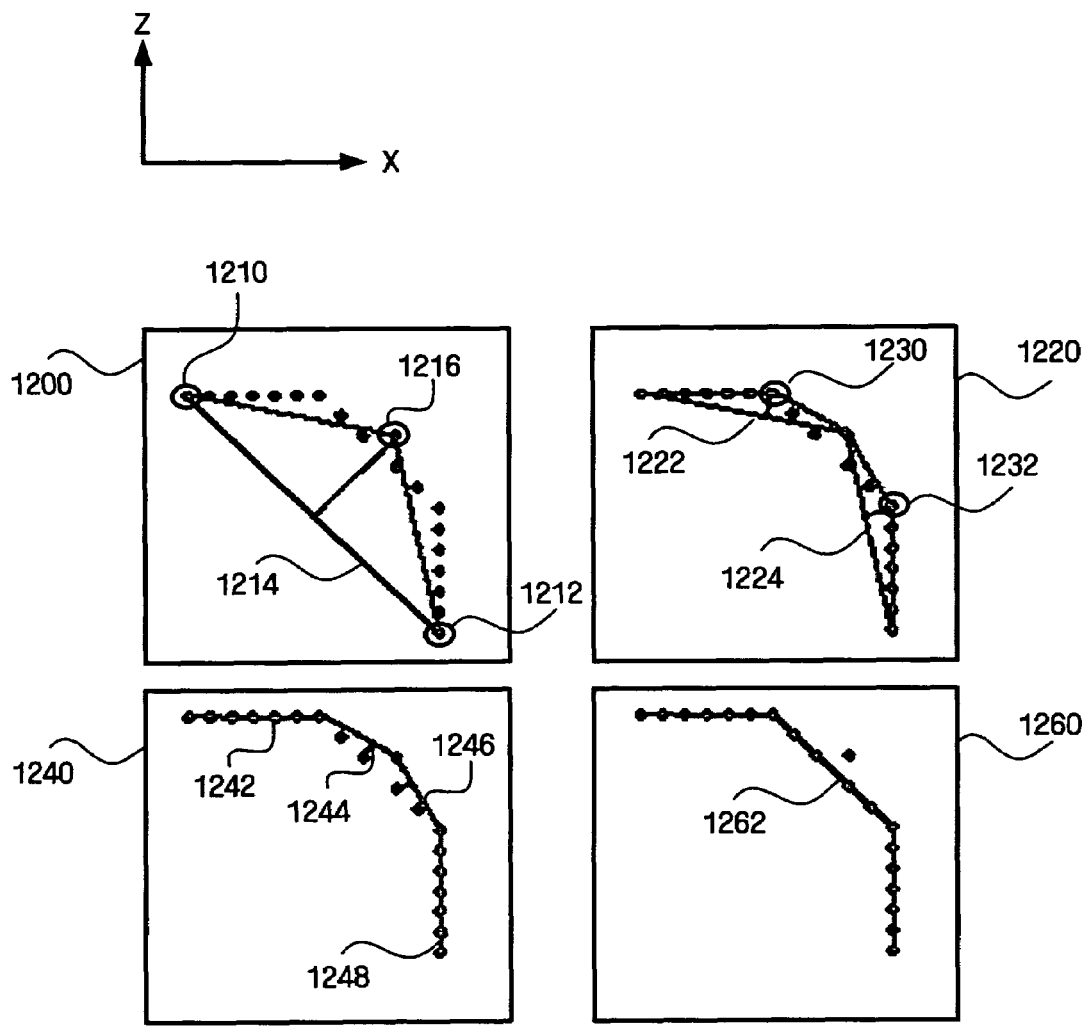
FIG. 12 illustrates split-merge performed to obtain the corner information according to an embodiment of the present invention.

FIG. 12 illustrates the conventional split-merge performed to obtain the corner information. In FIG. 12, a Z-direction is a direction of the distance from the light emission point to an obstacle, i.e., a reflector that reflects the laser light. Each point corresponds to distance data.

On a coordinate plane 1200, two end points 1210 and 1212 are selected and a line 1214 connecting the two end points 1210 and 1212 is obtained. Next, a distance between the line 1214 and each point is measured. If the measured distance exceeds a predetermined threshold, split occurs on the point.

For example, when a distance between a point 1216 and the line 1214 exceeds the predetermined threshold, as shown on a coordinate plane 1220, two lines 1222 and 1224 from the point 1216 to opposite end points are generated. Next, similar to the above-described operation, a distance between each of the lines 1222 and 1224 and each point is measured and it is determined whether the measured distance exceeds a predetermined threshold.

If points 1230 and 1232 are located at a distance exceeding the predetermined threshold from the lines 1222 and 1224, split occurs on the points 1230 and 1232. As a result, on a coordinate plane 1240, four lines 1242, 1244, 1246, and 1248 appear. Next, a distance between each of the lines 1242, 1244, 1246, and 1248 and each point is measured and it is determined whether the measured distance exceeds a predetermined threshold. When there is no measured distance exceeding the predetermined threshold, splitting ends and merging starts.

In the merge, when any distance between continued lines and each of the points near the lines does not exceed a predetermined threshold, a common line to the continued lines is created.

For example, on a coordinate plane 1260, a common line 1262 to the lines 1244 and 1246 is created.

When the split-merge is performed as illustrated in FIG. 12, the corner information can be obtained from finally created lines.

Meanwhile, the threshold used during the split-merge is usually proportional to the distance between a light emission point and a light reflection point. Alternatively, the threshold may be determined using pixel information of an image acquired by the camera 810. In detail, the threshold may be determined to be proportional to $|F(x_s, y_s) - F(x_s, y_s+1)|$ where $x_s$ and $y_s$ indicate random coordinates in the acquired image, $y_s+1$ is a coordinate shifted from the position $y_s$ by 1 pixel in a y-direction, and F(a, b) is a coordinate value on a new plane, e.g., the plane coordinate value 1110 (FIG. 11), into which a coordinate value $[a \; b]^T$ is converted using the triangular method.

To measure the height of an object, the above-described method of measuring the corner information of the object may be used. In detail, light of the light emitter 820 is vertically emitted to the object and an image is acquired by rotating the camera 810 at a predetermined angle in a vertical direction. Thereafter, the acquired image is analyzed to estimate an actual position of a point where an image line is interrupted. As a result, the height of the object can be measured. Alternatively, other conventional methods of measuring the height of an object existing in a space may be used to obtain the height information of the object.

When controlling a mobile robot based on a map created according to the present invention, a user can easily identify an object on the map and thus effectively control the mobile robot.

Although the present invention has been described in connection with the exemplary embodiments of the present invention, it will be apparent to those skilled in the art that various modifications and changes may be made thereto without departing from the scope and spirit of the invention which is set forth in the appended claims.

What is claimed is:

1. A system for identifying objects existing in a space, the system comprising:
    a mobile robot obtaining object identification information of each object in the space and transmitting the object identification information; and
    a remote control unit receiving the object identification information, identifying each object based on the object identification information, and allocating an identifier to each identified object,
    wherein the remote control unit comprises:
        a wireless transceiver receiving the object identification information from the mobile robot;
        a map processor identifying each object based on the object identification information and allocating the identifier to each object; and
        a user interface creating an object map using the identified object and its identifier and displaying the map to a user.

2. The system of claim 1, wherein the object identification information comprises width information of each object.

3. The system of claim 1, wherein the object identification information comprises corner information of each object.

4. The system of claim 1, wherein the object identification information comprises height information of each object.

5. The system of claim 1, wherein the mobile robot comprises:
    a traveling unit moving the mobile robot;
    an identification information measurer measuring the object identification information;
    a controller controlling the traveling unit according to the object identification information and outputting the object identification information; and
    a wireless transceiver transmitting the object identification information output from the controller to the remote control unit.

6. The system of claim 1, wherein the map processor has functional characteristic information and spatial characteristic information of each object and allocates the identifier to each object based on the functional characteristic information and spatial characteristic information.

7. The system of claim 1, wherein the user interface displays the identifier in text on the object map.

8. The system of claim 1, wherein the user interface displays the identifier in an image icon on the object map.

9. The system of claim 1, wherein the user interface comprises an input device allowing the user to directly allocate the identifier to each object on the object map.

10. The system of claim 1, wherein the user interface displays the objects in different colors on the object map.

* * * * *